No. 784,641. PATENTED MAR. 14, 1905.
J. L. TAYLOR.
WEIGHING SCOOP.
APPLICATION FILED MAY 17, 1904.
2 SHEETS—SHEET 1.
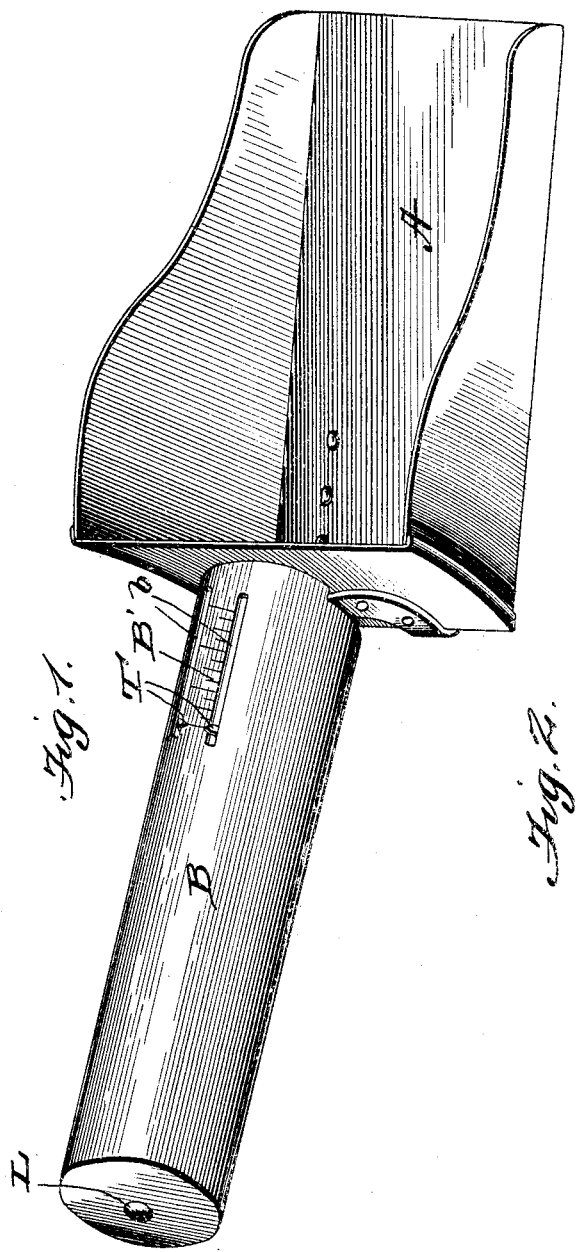
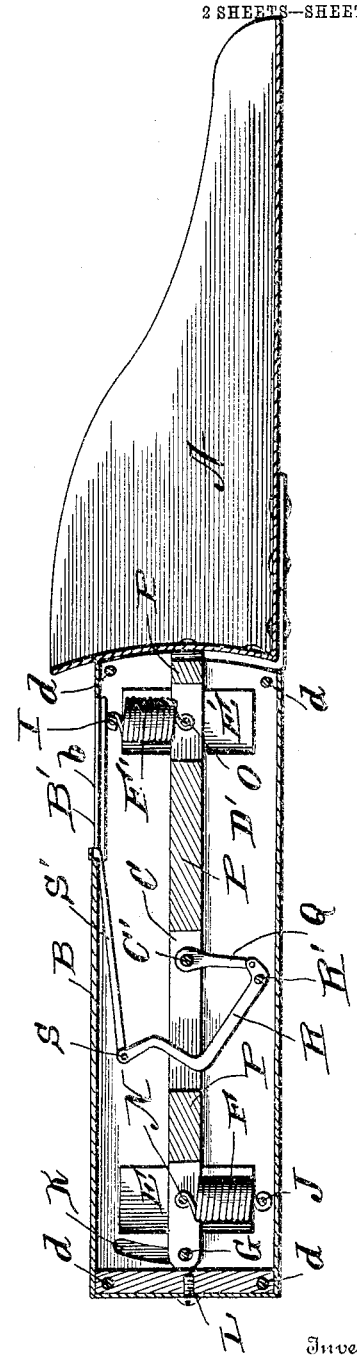
Witnesses
R. A. Boswell.
N. A. Mayhew.
Inventor
John L. Taylor.
By Franklin H. Hough
Attorney No. 784,641. PATENTED MAR. 14, 1905.
J. L. TAYLOR.
WEIGHING SCOOP.
APPLICATION FILED MAY 17, 1904.
2 SHEETS—SHEET 2.
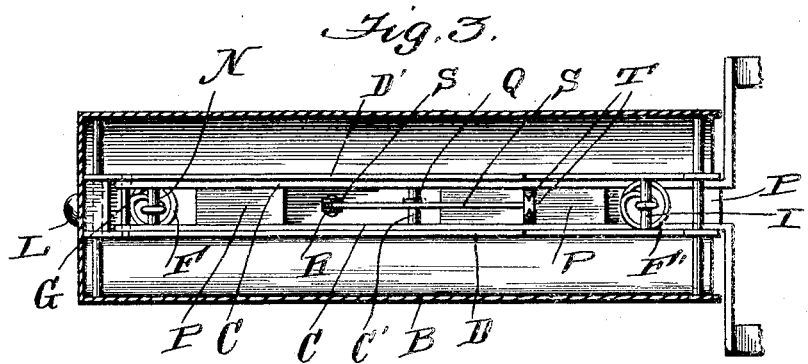
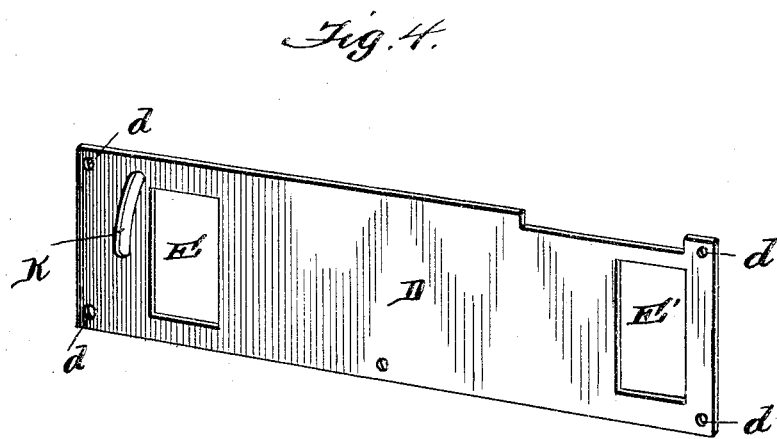
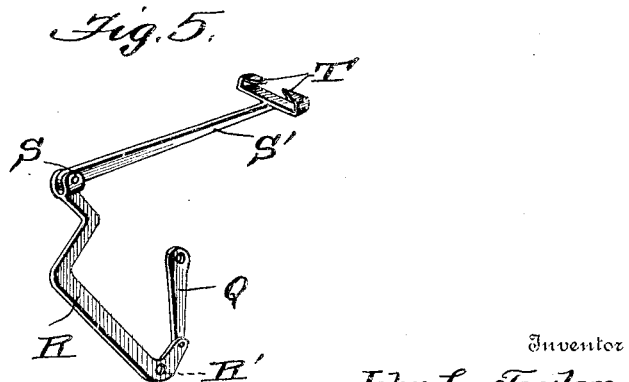
Witnesses
R. A. Boswell
N. A. Mayhew
Inventor
John L. Taylor.
By Franklin H. Hough
Attorney No. 784,641.    Patented March 14, 1905.

UNITED STATES PATENT OFFICE.

JOHN L. TAYLOR, OF BENTON HARBOR, MICHIGAN.

WEIGHING-SCOOP.

SPECIFICATION forming part of Letters Patent No. 784,641, dated March 14, 1905.

Application filed May 17, 1904. Serial No. 208,418.

*To all whom it may concern:*

Be it known that I, JOHN L. TAYLOR, a citizen of the United States, residing at Benton Harbor, in the county of Berrien and State of Michigan, have invented certain new and useful Improvements in Weighing-Scoops; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in weighing-scoops; and the object of the invention is to produce a simple and efficient device of this character in which commodities being weighed and wherever positioned within the scoop will indicate accurately the amount being weighed upon a dial.

The invention consists in various details of construction and combinations and arrangements of parts, which will be hereinafter fully dsscribed and then specifically defined in the appended claims.

My invention is illustrated in the accompanying drawings, which, with the letters of reference marked thereon, form a part of this application, and in which drawings similar letters of reference indicate like parts in the views, in which—

Figure 1 is a top plan view of a scoop made in accordance with my invention. Fig. 2 is a vertical sectional view through the same, parts being shown in elevation. Fig. 3 is an edge view of the weighing mechanism. Fig. 4 is a detail view of one of the plates to which the weighing apparatus is held, and Fig. 5 is a detail view of the indicating apparatus.

Reference now being had to the details of the drawings by letter, A designates a scoop which may be of any size or shape and made of any suitable material, and B is a hollow handle having a scale B' upon its outer face and positioned adjacent to the end which is adapted to be attached to the scoop.

C C designate two bracket-arms which are angular at their ends and fastened to the back and bottom portions of the scoop and are fastened thereto by means of pins.

D and D' designate two plates which are fastened together by means of pins passing through the apertures $d$ in the corners of said plates and each of said plates has apertures E and E', adapted to receive the springs F and F', respectively, which have play in said apertures.

G designates a pin which is fastened to the rear ends of the arms C C, and the ends of said pin project beyond the outer faces of said arms and are adapted to have a play in the elongated curved slots K in the plates D and D'. Said pin G serves to guide the rear ends of the arms and also serves in coöperation with the edge of the slot to form a stop to take up jar incident to a thrust of the scoop into a commodity to be weighed. The spring F is connected at one end to a pin J, carried by the plates D and D', and its other end is fastened to a pin N, carried by said arms C C, while the spring F' is fastened to a pin O, also held between said arms C C, and its other end is fastened to a pin I, carried by the plates D and D' near the upper forward edges of the same.

Suitable washers or blocks P are interposed between the two arms C C to hold the same spaced apart, and mounted upon a pin C' intermediate the arms C C is a link Q, one end of which is pivoted to the angle-lever R, which is pivotally mounted upon a pin R', carried by the plates D and D'. Said lever R is pivoted at S to an indicating-pointer S', which latter has fingers T bent at right angles from the edge thereof and adapted to overhang the marginal edges of the walls $b$, formed in the handle of the scoop along the opposite marginal edges of the scale referred to.

After the arms C C have been adjusted between the plates D and D' the latter are inserted in the handle B and held in place by means of a screw L, which passes through the end of the handle and engages a block interposed between the two plates D and D'.

In operation if the weight is placed in the back portion of the scoop it will cause a tension upon the spring F' by the tilting down of the arms C, connected to said spring, a certain distance; but if the weight is placed in the front portion of the scoop a greater tension will be brought upon the spring F' by reason of the increased leverage, and the spring F will be slightly under tension to overcome the extra leverage, and there will be a certain point intermediate the two springs at which an indicator mechanism may be connected whereby the same amount of goods being weighed may be indicated upon the scale wherever the commodity may be placed within the scoop. As the arms are drawn down by the weight in the scoop the link Q will cause the angle-lever R to tilt upon its pivot, and the indicating-finger S' will move over the scale to indicate accurately the amount being weighed. It will thus be seen that by the arrangement shown and described the leverage and tension are equalized wherever the commodity is placed in the scoop, and by the provision of the stops at the ends of the arms the scoop may be thrust with force into any commodity without injury to the delicate parts, as the jar incident to the coming in contact with the matter being weighed will be taken up.

While I have shown a particular detailed construction of apparatus illustrating my weighing-scoop, it will be understood that I may differentiate the construction of the same, if desired, without in any way departing from the spirit of the invention.

Having thus fully described my invention, what I claim as new, and desire to secure by Letters Patent, is—

1. A weighing apparatus comprising a scoop, arms secured to said scoop and spaced apart, plates between which said arms are supported, a handle provided with a scale thereon secured to said plates, springs secured to said plates and adapted to support said arms, and an indicator-finger having pivotal link-and-lever connections with said arms and adapted to move over said scale, as set forth.

2. A weighing apparatus comprising a scoop, arms secured to the latter with a handle detachably held to the scoop and having a scale on the surface thereof with slots adjacent thereto, plates spaced apart, pins carried by said plates, springs secured at their outer ends to the pins carried by said plates, pins fastened to said arms and to which the inner ends of said springs are fastened, said springs adapted to have tension in opposite directions as the arms are tilted, means for limiting the throw of said arms in one direction, an indicator adapted to move over said scale, and pivotal link-and-lever connections between said indicator and said arms, as set forth.

3. A weighing apparatus comprising a scoop, a handle detachably held thereto and having a scale upon the surface thereof, arms secured to said scoop having shank portions spaced apart, pins connecting said arms, slotted plates held together by pins and between which said arms are mounted, a pin carried by said arms and having ends projecting beyond the sides thereof and adapted to have a play in curved slots in said plates, springs secured at their outer ends to pins carried by said plates and their inner ends secured to said arms, an indicating-pointer adapted to play over said scale, and pivotal link-and-lever connections with said arms intermediate said springs, as set forth.

4. A weighing apparatus comprising a scoop, a handle detachably held thereto and provided with a scale upon the surface thereof, with a slot in said handle adjacent to said scale, arms fastened to the scoop and having shank portions which are spaced apart, slotted plates and pins for holding the same together and between which plates said arms are mounted, springs secured one at its outer end adjacent to the rear ends of said plates, and a second spring secured at its outer end adjacent to the forward ends of the plates, the inner ends of said springs being fastened to said arms, a stop-pin carried by said arms and projecting beyond the outer faces thereof and having play in curved slots in said plates, a link pivotally mounted between said arms, an indicating-pointer, and pivotal connections between the same and said link, as set forth.

5. A weighing apparatus comprising a scoop, a handle detachably held thereto and provided with a scale upon the surface thereof, with a slot in said handle adjacent to said scale, arms fastened to the scoop and having shank portions which are spaced apart, slotted plates and pins for holding the same together and between which plates said arms are mounted, springs secured one at its outer end adjacent to the rear ends of said plates, and a second spring secured at its outer end adjacent to the forward ends of the plates, a stop-pin carried by said arms and projecting beyond the outer faces thereof and having play in curved slots in said plates, a link pivotally mounted between said arms, an indicating-pointer having a finger extending through said slot in the handle and adapted to move over said scale, and an angle-lever pivotally connected to said link and indicating-pointer, as set forth.

6. A weighing apparatus comprising a scoop, a hollow handle detachably held thereto and provided with a scale upon its surface with slots along the marginal edges thereof, arms secured to said scoop and having shank portions which are spaced apart, plates between which said arms are mounted, said plates having transverse apertures, pins carried by said plates, springs secured at their outer ends each to one of said pins and positioned in said transverse apertures, the inner ends of the springs being connected to said arms, an indicator having fingers projecting through said slots and adapted to move over said scale, a link pivotally supported by said arms, an angle-lever pivotally mounted upon said plates and having pivotal connection with said indicator and said links, as set forth.

In testimony whereof I hereunto affix my signature in presence of two witnesses.

JOHN L. TAYLOR.

Witnesses:
 HUMPHREY S. GRAY,
 ANNA E. JENNINGS.